United States Patent [19]
Maurice

[15] 3,667,321
[45] June 6, 1972

[54] CONTINUOUS TRANSMISSION, ESPECIALLY FOR AUTOMOBILE VEHICLES

[72] Inventor: Jean Maurice, Paris, France
[73] Assignee: Societe Anonyme Francaise du Ferodo, Paris, France
[22] Filed: Aug. 7, 1969
[21] Appl. No.: 848,310

[30] Foreign Application Priority Data

Aug. 29, 1968 France.....................................164477

[52] U.S. Cl...............................................74/682, 74/687
[51] Int. Cl........................................................F16h 47/04
[58] Field of Search...................74/682, 686, 687, 689, 691, 74/681, 688, 690

[56] References Cited

UNITED STATES PATENTS

| | | | |
|---|---|---|---|
| 3,340,749 | 9/1967 | Magg et al. | 74/689 |
| 3,357,225 | 12/1967 | Grube | 74/675 X |
| 3,426,621 | 2/1969 | Mooney, Jr. et al. | 74/720.5 |
| 3,427,899 | 2/1969 | Gunderson et al. | 74/687 |
| 3,433,095 | 3/1969 | Tuck | 74/687 |
| 3,470,769 | 10/1969 | Livezey | 74/687 X |
| 3,492,891 | 2/1970 | Livezey | 74/687 X |
| 3,503,278 | 3/1970 | Livezey | 74/720.5 X |

FOREIGN PATENTS OR APPLICATIONS 938,066  3/1948  France.......................................74/687

Primary Examiner—Arthur I. McKeon
Assistant Examiner—Thomas C. Perry
Attorney—Young & Thompson

[57] ABSTRACT

A continuous power transmission device provided between a movement take-off and a receiving shaft, especially for automobile vehicles, comprising a reversible continuous speed-varying device and a planetary train with four elements, in which two elements of said train are continuously active, one of said elements being coupled to the movement take-off through the intermediary of said reversible continuous speed-varying device and the other element being coupled to said shaft, each of the two remaining elements, known as change-over elements being adapted to be rendered active or passive, and further comprising means for rendering one of said change-over elements active while the other element is passive, and vice versa.

7 Claims, 7 Drawing Figures

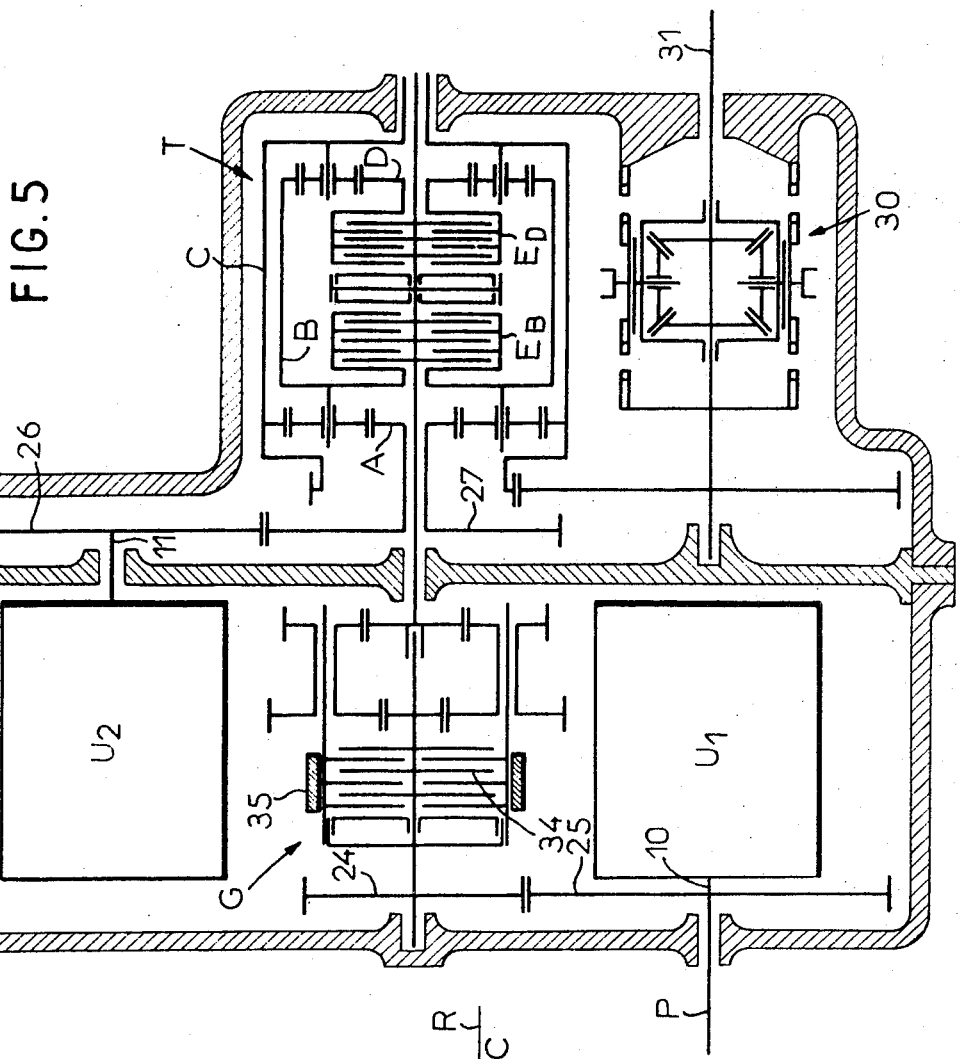

INVENTOR
JEAN MAURICE
BY Young + Thompson
Attys.

INVENTOR
JEAN MAURICE
By Young & Thompson
ATTYS.

CONTINUOUS TRANSMISSION, ESPECIALLY FOR AUTOMOBILE VEHICLES

Continuous reversible speed-changing devices, for example of the mechanical type with extensible pulleys and belts, or of the hydraulic type with two pump/motor units, or electrical, etc., make it possible to establish a ratio of speed and a ratio of torque which are continuously variable between a first and a second shafts, with transmission in either direction, that is to say from the first shaft to the second or vice versa.

Devices of this kind are of considerable advantage in numerous applications, and in particular in the application to automobile vehicles but, unless they are over-dimensioned, the range of operation, forward and/or reverse, over which they are utilizable with acceptable efficiency and life, is relatively narrow.

It has already been proposed to associate a planetary gear with a continuous speed-changing gear in order to improve its conditions of working.

The present invention relates to a continuous transmission system, especially for automobile vehicles, comprising the association of a continuous reversible speed-changing gear with a planetary gear train with four elements of the family to which belong, amongst others, an assembly of two simple planetary portions which each have a planet wheel, a crown-wheel and a satellite carrier, and which are coupled together in a symmetrical manner by fixing the satellite carrier of one rigidly to the crown-wheel of the other, and vice versa.

To give an idea, the above-mentioned family comprises, in addition to such a train with two simple planetary portions coupled together: the trains having two sets of satellites engaging with each other, in which a planet-wheel engages with a set of satellites, another planet-wheel and a crown-wheel engage with the other set of satellites, and a satellite carrier carries the two sets of satellites. The gear trains comprising three conical planet-wheels and a satellite carrier having double satellites with conical pinions, of which one engages with two of the planet-wheels while the other engages with the third planet-wheel; the gear trains comprising three planet-wheels and a satellite carrier having triple satellites engaging respectively with the three planet-wheels, etc.

This family of planetary trains of four elements is hereinafter termed "family of the kind described" and it is said that an element of the train is in the "active" condition when it is coupled to a member external to the train, having a driving or resistant torque (in the limit, a fixed abutment), and it is said that an element of the train is in the "passive" condition when it is disconnected from any member external to the train, that is to say when it is left free.

In general, in known transmissions comprising the association of a continuous speed-varying device and a planetary gear train with four elements, one of the elements of the train is continuously coupled to a movement take-off, for example a driving shaft, another element is continuously connected to a receiving shaft and the two remaining elements are coupled together through the intermediary of the continuous speed-varying device.

An arrangement of this kind makes it possible for the speed-varying device to work under operating conditions which are less severe than those in which it would be placed if it were directly interposed between the driving shaft and the receiving shaft. However, it does not resolve in an entirely satisfactory manner the problem of small overall size for the speed-varying gear with an extended range of speed ratios for the transmission.

The present invention has for its object a continuous transmission between a movement take-off and a receiving shaft, especially for automobile vehicles, comprising a continuous reversible speed-varying gear preferably having a forward range and a reverse range, and a planetary train with four elements of the family of the type described, which complies better than in the past with the various requirements of practice, in particular as regards the dimensioning of the speed-varying gear, its life, the efficiency of the transmission and/or the extent of the speed ratios of the transmission.

The continuous transmission forming the object of the invention is especially characterized in that two elements of the train are active in a continuous manner while being coupled, one to the movement take-off through the intermediary of the reversible continuous speed-varying gear, the other to the receiving shaft, in that each of the two remaining elements, known as the switching elements is adapted to be made active or passive, and in that means are provided for making one of the said elements active while the other element is passive, or vice versa, so as to obtain operation of the transmission over at least two ranges for the purpose of increasing its performance.

These two ranges are preferably but not necessarily chosen to be contiguous in order to obtain continuity in the variation of the speed ratios of the transmission between the lowest ratio and the highest ratio. The planetary train is preferably chosen to be strictly or approximately harmonic and/or symmetrical, as will be explained in a detailed manner below. When the ranges are not contiguous, there are obtained two ranges of continuous variation of ratios with a gap between them.

In a first form of embodiment of the invention, each of the two change-over elements is adapted, when it is placed in an active condition, to be coupled to the movement take-off. With an arrangement of this kind, the maximum power passing into the speed-varying gear is substantially reduced, which makes it possible to provide this latter with reduced dimensions.

The coupling between each change-over element and the movement take-off may be direct or alternatively it may comprise auxiliary means for improving the performance, consisting of a box having two or more ratios, which makes it possible to multiply the possible combinations of operation. This box may be of any appropriate type.

In a second form of embodiment of the invention, one of the two change-over elements is adapted, when it is placed in an active condition, to be coupled to the movement take-off, while the other change-over element is adapted, when it is placed in an active condition, to be coupled to the fixed frame. With such an arrangement, the extent of the speed ratios of the transmission is substantially increased.

In this second form of embodiment of the invention, the change-over element adapted, when it is placed in an active condition, to be coupled to the movement take-off, has an additional active condition in which it is coupled to the fixed frame, which provides the transmission with reverse operation in addition to forward operation.

Auxiliary means for further improving the performance of this second form of embodiment of the invention may be provided, and comprise a second gear train similar to that of the second form of embodiment of the invention and receiving as its continuous input, the output of this gear train, and having two change-over elements of which one can be coupled to the movement take-off and the other to the fixed frame. If necessary, this arrangement can be repeated several times.

In a third form of embodiment of the invention, two gear trains are provided, the first similar to the first form of embodiment of the invention, while the second, which is arranged in a manner similar to that of the second form of embodiment, receives as its continuous input the output of the first, and has two change-over elements, one of which can be coupled to the movement take-off and the other to the fixed train. By virtue of this arrangement, the maximum power passing through the speed-varying gear is substantially reduced, which makes it possible to give this latter smaller dimensions, while at the same time the extent of the speed ratios of the transmission is increased.

The performance of this third form of embodiment of the invention may also be further improved by the auxiliary means which have been previously referred to and which are applicable to the first and/or the second gear train.

The objects, characteristic features and advantages of the invention will be further brought out in the description which follows below of forms of embodiment chosen by way of example, reference being made to the accompanying drawings, in which:

FIG.4 is similar to FIG.1 and FIG.5 is similar to FIG.2, but relate to an alternative form;

Figure 2:
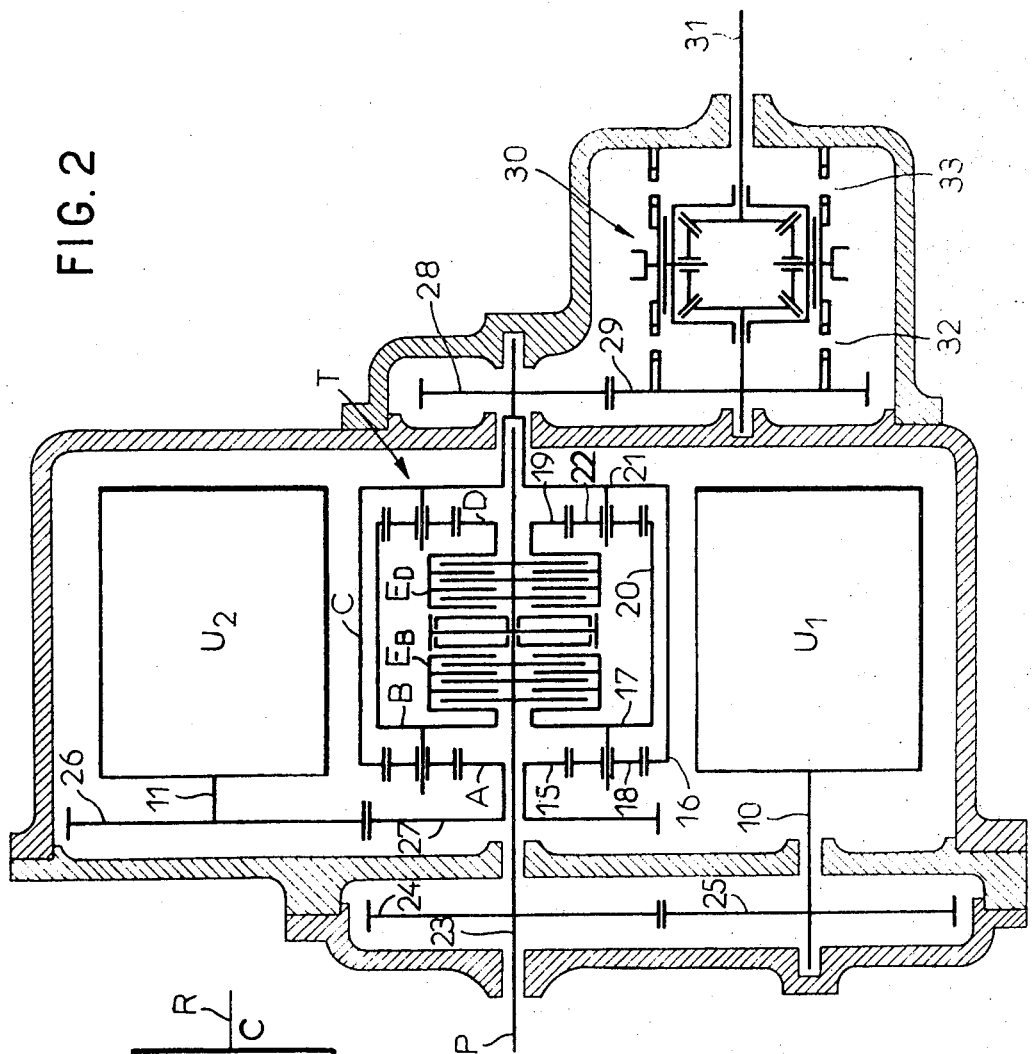
FIG.2 is a diagrammatic view of this transmission in longitudinal section.
Figure 1:
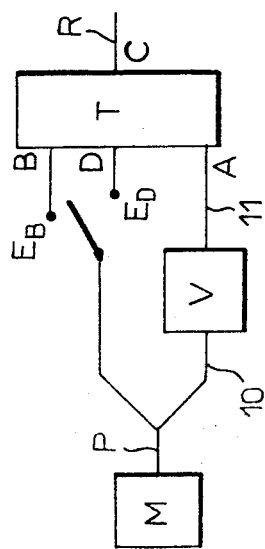
FIG.1 is a diagram of a transmission in accordance with the invention.
Figure 7:
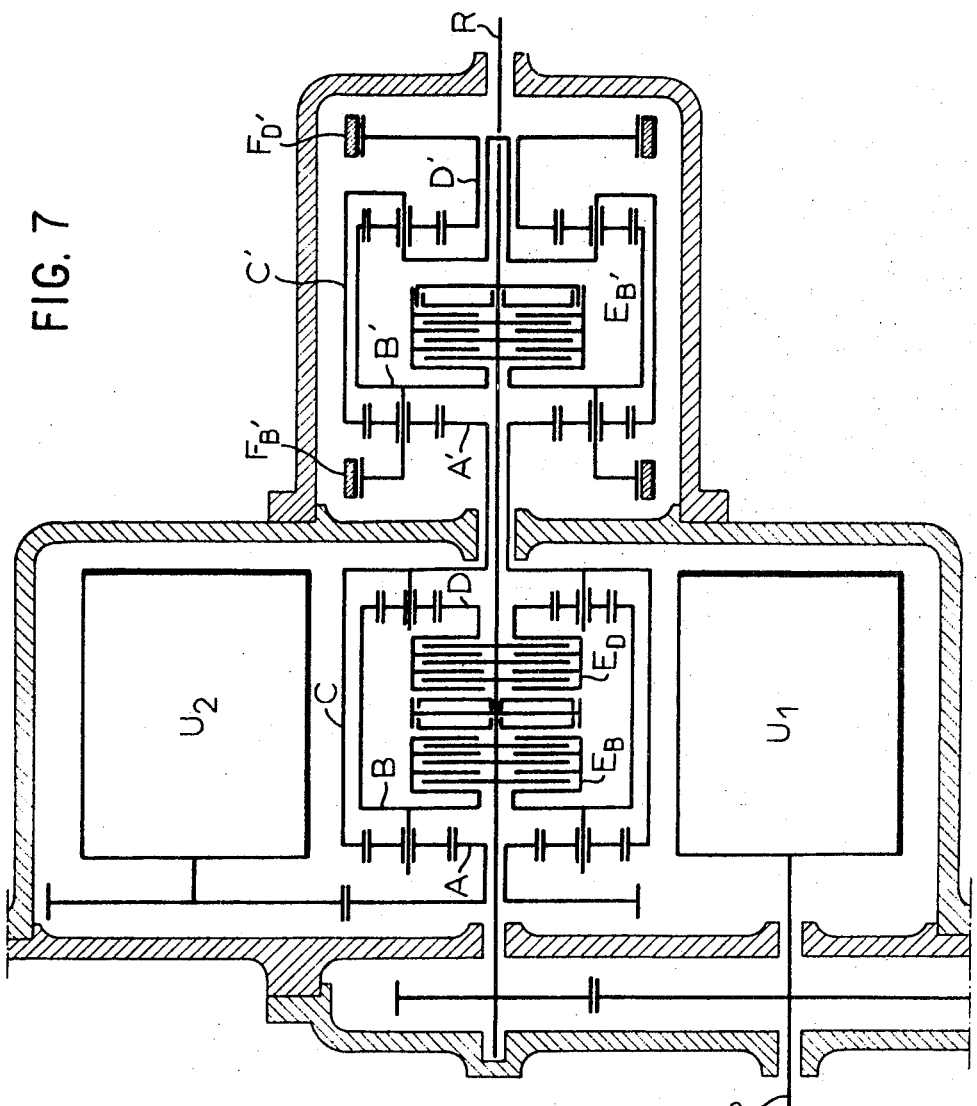
Figure 6:
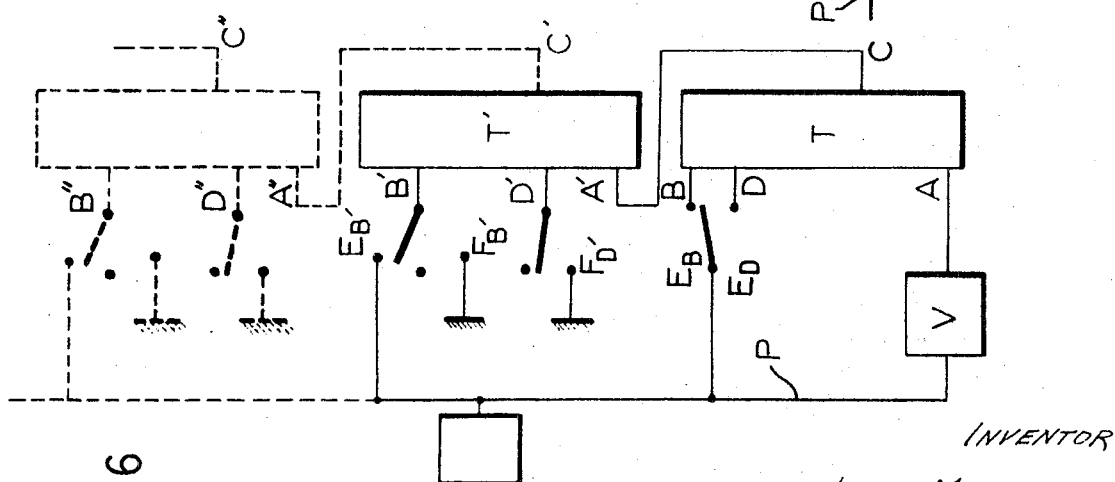

FIG.6 6 is similar to FIG.1 and FIG.7 is similar to FIG.2 but relate to still another alternative form.

Figure 3:
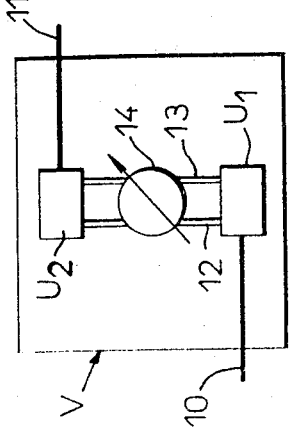
FIG.3 shows diagrammatically the reversible continuous speed-varying gear of the transmission shown in FIGS.1 and 2.

Reference will first be made to FIGS.1 to 3. A transmission between a movement take-off P and a receiving shaft R comprises a continuous reversible speed-varying gear V and a planetary train T with four elements A, B, C, and D.

The continuous reversible speed-varying gear V may be of any appropriate type which permits the establishment of a speed ratio and a torque ratio which are continuously variable between two shafts 10 and 11 (FIG.3) with transmission in either direction and providing a forward range and a reverse range. Such a speed-varying device V is for example of the hydraulic type shown in FIG.3, 3, comprising two units $U_1$ and $U_2$ associated respectively with the shafts 10 and 11, each unit being either driving or driven, the units $U_1$ and $U_2$ being coupled together by conduits 12 and 13 with the interposition of a control device 14 which enables the speed and torque ratios of the shafts 10 and 11 to be continuously regulated.

The planetary train T with four elements A, B, C, and D belongs to the family of the type described, and comprises, in the example of FIG.2, two single planetary gears coupled together. One of these planetary portions has a planet-wheel 15, a crown-wheel 16 and a satellite carrier 17, the satellites 18 of which engage with the planet-wheel 15 and with the crown-wheel 16. The other planetary portion has a planet-wheel 19, a crown-wheel 20 and a satellite carrier 21, the satellites 22 of which engage with the planet-wheel 19 and the crown-wheel 20. The satellite carrier 17 is fixed to the crown-wheel 20, while the crown-wheel 16 is fixed to the satellite carrier 21.

The first element A is constituted by 15; the second element B is constituted by gear elements 17 and 20; the third element C is formed by gear elements 16 and 21, and the fourth element D is constituted by 19.

Referring to the various diagrams of FIGS.1, 4, 6, 7, 9 and 11, it will be noted that in all cases the two elements of the train A and C are active continuously. The element A is coupled to the movement take-off P through the intermediary of the speed-varying device V. The element C is coupled to the receiving shaft R. The two remaining elements B and D, known as the change-over elements, are each adapted to be made active or passive. The element B is active while the element D is passive and the element D is passive while the element D is active. In this way, the operation of the transmission has at least two ranges, contiguous or otherwise.

In the example of FIGS.1 to 3, each of the change-over elements B and D is adapted, when it is put into an active condition, to be coupled to the movement take-off P. This result is obtained by means of two clutches $E_B$ and $E_D$ (FIGS.1 and 2).

In more detail, the transmission of the example shown in FIGS.1 to 3 comprises a driving shaft 23 which is driven by a motor M and which constitutes the movement take-off P in this case. The clutch $E_B$ is interposed between the shaft 23 and the satellite carrier 17 forming the element B, while the clutch $E_B$ is interposed between the shaft 23 and the planet-wheel 19 forming the element D.

The clutches $E_B$ and $E_D$ are of the multi-disc type, for example.

The shaft 23 is coupled by a pair of pinions 24 and 25 to the shaft 10 of the unit $U_1$ of the speed-varying device V. The shaft 11 of the unit $U_2$ of the said speed-varying device V is coupled by a pair of pinions 26 and 27 to the planet-wheel 15 which forms the element A.

The receiving shaft R which is fixed to the crown-wheel 21 forming the element C is coupled by two pinions 28 and 29 and by a direction-reversing device 30 to the output shaft 31 of the transmission. The reversing device 30 may be of any suitable type and comprises for example a forward-running dog clutch 32 and a reversing dog-clutch 33.

In a first range of increasing ratios of the transmission, the unit $U_2$ of the speed-varying device B first operates over the reversing range with a reduction of the speed ratios of the speed-varying device V until this ratio is annulled, and then over the forward range with an increase of the said speed ratio from zero up to a maximum. During this first range, the clutch $E_D$ is engaged and the clutch $E_B$ is released.

Over a second range of increasing transmission ratios, the unit $U_2$ of the speed-varying device V first continues to work on the forward range with reducing ratios of speeds of the speed-varying device V from this maximum down to zero, and then works on the reverse range with increase of the said ratios from zero up to a maximum, which may be equal to or different in absolute value from the maximum of the first range. During this second range, the clutch $E_B$ is engaged and the clutch $E_D$ is released.

By virtue of the arrangement which has just been described, the power passing into the speed-varying device V and which decreases as the transmission ratio increases, has a maximum value considerably lower than the output of the motor. This enables the dimensions of the speed-varying device V to be reduced and increases its life.

It will be appreciated that the two ranges of operation referred to above are contiguous, which permits full use to be made of the speed-varying device V.

At the junction point of the two contiguous ranges, the power relative to the first range is the same as the power relative to the second range.

If $m_1$ and $m_2$ represent the respective basic or overall ratios of the portion 15, 16, 17, 18 and the portion 19, 20, 21, 22 of the gear train T, namely:

$$m_1 = \frac{\text{number of teeth of the crown-wheel 16}}{\text{number of teeth of the planet-wheel 15}}$$

$$m_2 = \frac{\text{number of teeth of the crown-wheel 20}}{\text{number of teeth of the planet-wheel 19}}$$

the equality of powers is expressed by the following harmonic relation:

$$m_1 \times m_2 = 1 + m_1 + m_2 \qquad (1)$$

A gear train T which satisfies the relation (1) is designated in the present description by the term harmonic train.

It is also advantageous, especially for reasons of simplicity, to have the following symmetrical relation:

$$m_1 = m_2 \qquad (2)$$

A gear train T which satisfies the relation (2) is designated in the present description by the term symmetrical train.

The train T preferably satisfies both relations (1) and (2) at the same time, and the basic ratio of such a symmetrical harmonic train is:

$$m = m_1 = m_2 = 2.414 \qquad (3)$$

Good results have been obtained with a symmetrical harmonic train T, the pinions of which have the following numbers of teeth:

Pinions 15 and 19: 34 teeth
Crown-wheel 16 and 20: 83 teeth
Satellites 18 and 22: 24 teeth.

There is thus obtained a continuous transmission in which the ratio of speeds varies from 0.414 to 1.828 with a speed-varying device V, the maximum power of which only requires to be 41.4 percent of that of the motor.

Instead of the train T being strictly harmonic and/or symmetrical, it may of course only satisfy the conditions (1) and/or (2) in an approximate manner, at the same time permitting excellent operation. In case of need, it is possible to compensate such an approximation by conditioning in consequence the speed-varying device and/or the transmission.

In the example of FIGS.1 and 2, the elements B and D are coupled with the same ratio to the movement take-off, but they could be connected thereto with different ratios.

Reference will now be made to FIGS. 4 and 5, in which the arrangement is similar to that which has just been described with reference to FIGS. 1 to 3, but in which an auxiliary means is provided. This auxiliary means consists for example of a gear-box G which is interposed between the movement take-off P and the clutches $E_B$, $E_D$, which make it possible to multiply the obtainable combinations of operation.

The gear-box G has for example two speed ratios: unity ratio obtained by a clutch 34 and a small ratio obtained by a brake 35.

By acting on the various parts $E_B$, $E_D$, 34, 35 and on the speed-varying device V, it is possible to obtain for example a continuous transmission in which the ratio of speeds between P and C (FIG. 5) is of the order of 0.33 to 2.5 with a speed-varying device V, whose maximum power only requires to be 33 percent of that of the motor.

Reference will now be made to FIGS. 6 and 7, in which two trains T and T' are provided, the first similar to that of FIG. 1 with elements A, B, C, and D, and the second with elements A', B', C', and D'.

The element A is coupled to the movement take-off P through the intermediary of the speed-varying device V, while the element C is fixed to the element A'.

The elements B and D are coupled respectively to the movement take-off P by clutches $E_B$ and $E_D$ as in FIG. 1, while the elements B' and D' are coupled respectively on the one hand to the movement take-off P by a clutch $E_B$, to the fixed frame by a brake $F_B$, and on the other hand to the fixed frame by a brake $F_D$. The element C' constitutes the output of the transmission.

With an arrangement of this kind, the advantages of the arrangement of FIG. 1 are accumulated, and there is obtained a transmission in which the maximum power passing through the speed-varying device is reduced and which has a large range of speed ratios.

More particularly, on forward running it is possible to obtain a ratio of speeds varying from 0.43 to 2.43 and for reverse running a ratio of speeds varying from 0.43 to 1.43, while using a speed-varying device V having a maximum power which is 33 percent of that of the motor.

If necessary, other trains can be added to the sequence, such as for example the train T'' indicated in broken lines at A'', B'', C'', and D'' in FIG. 6, in order to increase still further the range of speed ratios of the transmission.

The invention is not limited to the forms of embodiment described and illustrated, but includes all alternative forms.

What I claim is:

1. A continuous power transmission for use in motor vehicles arranged between an input shaft and an output shaft, comprising a continuous speed-varying device driven by said input shaft, a plurality of planetary gear trains each including a plurality of drivingly connected gear elements providing parallel power paths of different ratio, one of said planetary gear trains having a first element driven by said speed-varying device and a second element common to a first element of another of said planetary gear trains, said one planetary gear train having a third element common to a second element of said another planetary gear train and driving said output shaft, said another planetary gear train having a third element, and control means for selectively coupling either of said first and third elements of said another planetary gear train to said input shaft.

2. A transmission as claimed in claim 1, said one planetary gear train having an overall ratio $m_1$ and said another planetary gear train having an overall ratio $m_2$, the following relationship being satisfied: $m_1 \times m_2 = 1 + m_1 + m_2$.

3. A transmission as claimed in claim 1, said one planetary gear train having an overall ratio $m_1$ and said another planetary gear train having an overall ratio $m_2$, the following relationship being satisfied: $m_1 = m_2$.

4. A transmission as claimed in claim 1, said one planetary gear train having an overall ratio $m_1$ and said another planetary gear train having an overall ratio $m_2$, the following relationships being satisfied:
$$m_1 \times m_2 = 1 + m_1 + m_2 : m_1 = m_2.$$

5. A transmission as claimed in claim 1, having a fixed frame, and a further planetary gear train between said third element of said one planetary gear train and said output shaft, said further planetary gear train comprising a first element coupled to said third element of said one planetary gear train, a second element adapted to be selectively coupled to the input shaft, a third element coupled to the output shaft, a fourth element adapted to be selectively coupled to said fixed frame, and control means for selectively coupling said second element of said further train to the input shaft or making it free, and for selectively coupling said fourth element of said further train to said fixed frame or making it free.

6. A transmission as claimed in claim 5, the last-named control means selectively coupling said second element of said further train to said fixed frame.

7. A transmission as claimed in claim 1, and a gear box interposed between said input shaft and said control means.

* * * * *